Nov. 7, 1933.　　　　　F. MICHEL　　　　　1,933,562
FILM MAGAZINE
Filed Jan. 23, 1931　　　　3 Sheets-Sheet 1
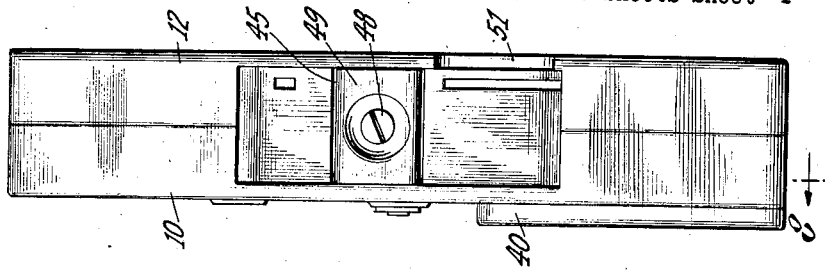
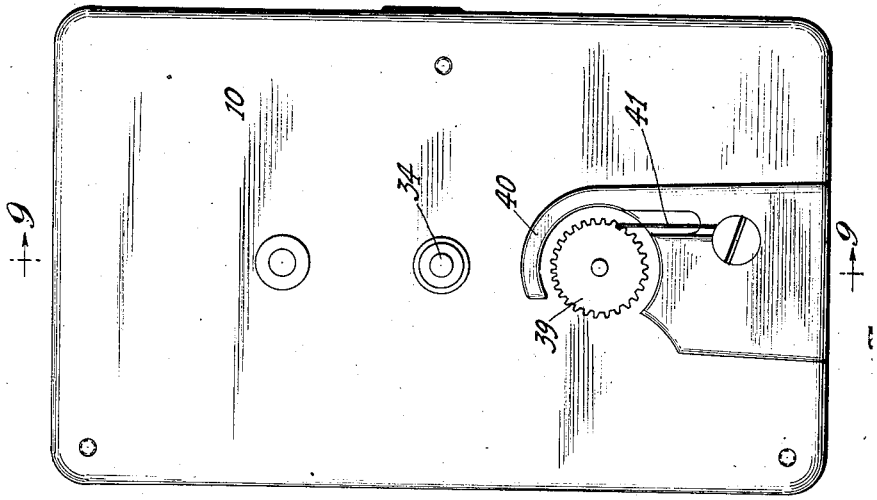
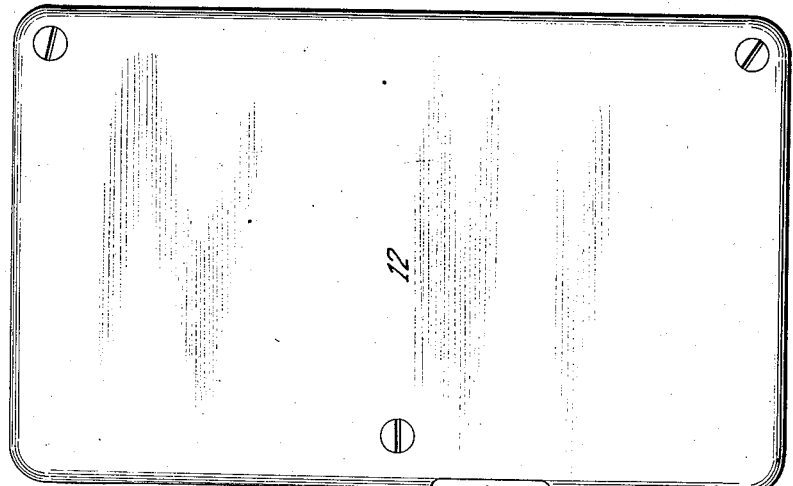
Inventor
Frederick Michel.
By his Attorneys

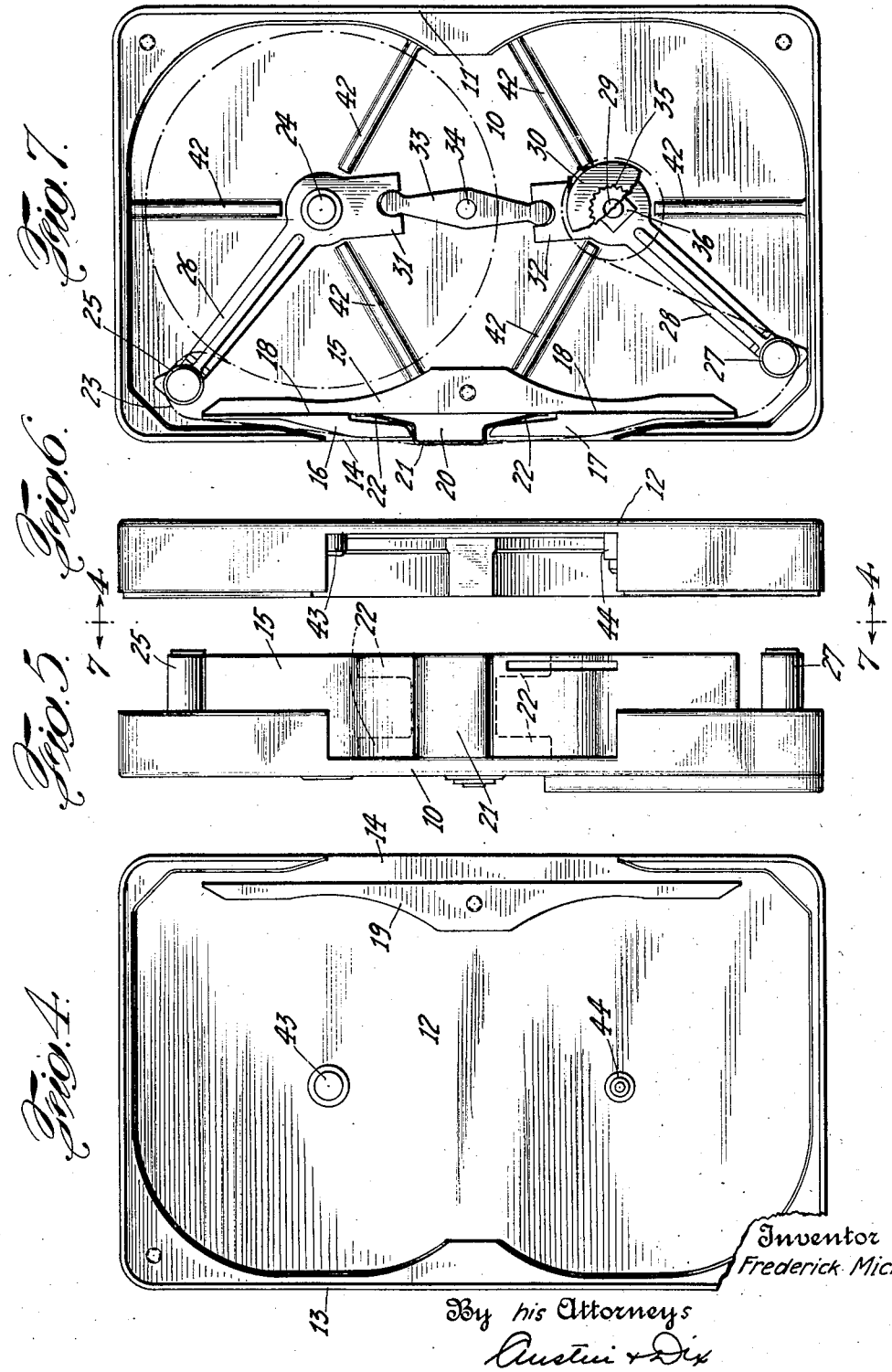

Nov. 7, 1933.   F. MICHEL   1,933,562
FILM MAGAZINE
Filed Jan. 23, 1931   3 Sheets-Sheet 3
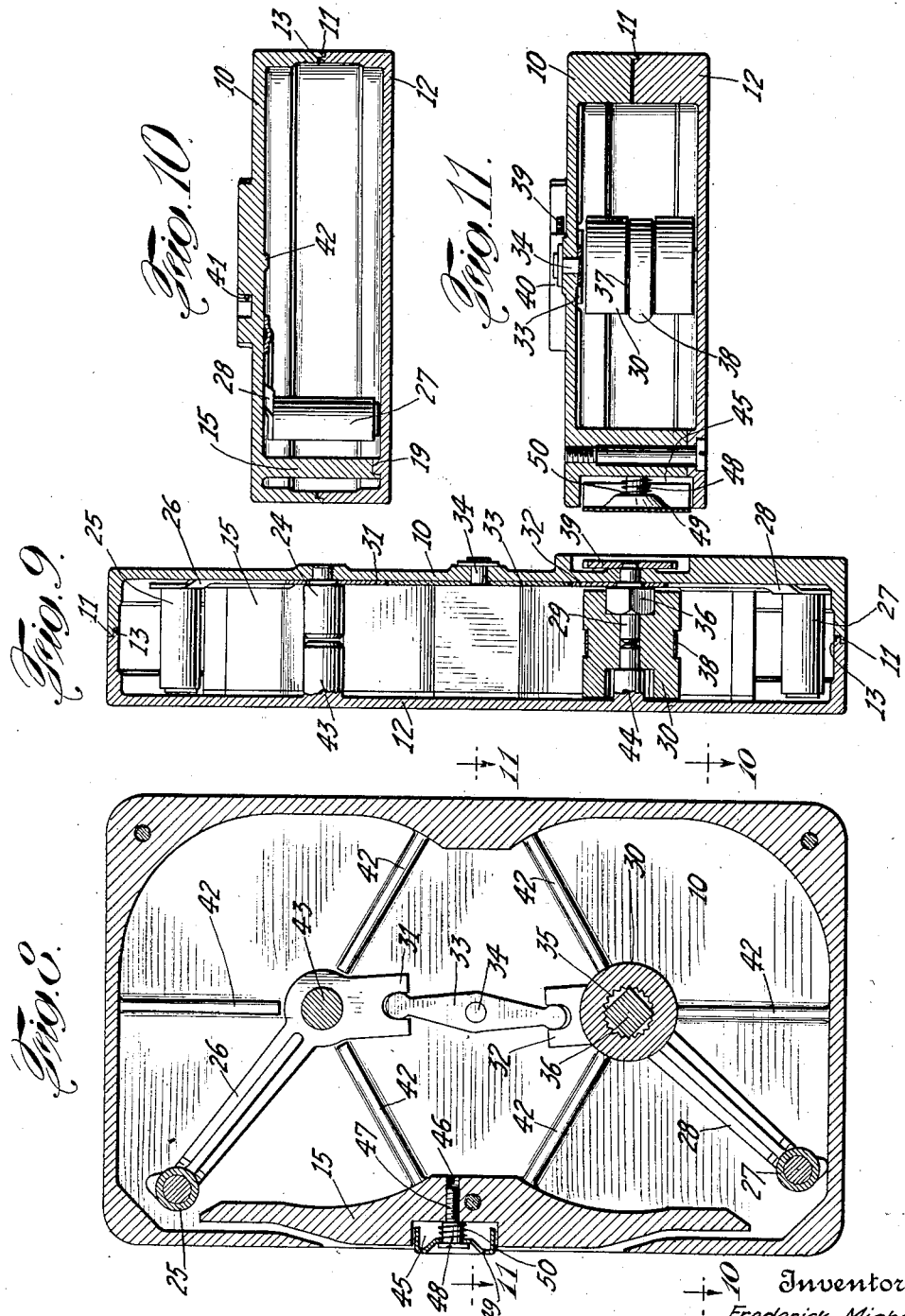
Inventor
Frederick Michel
By his Attorneys Patented Nov. 7, 1933

1,933,562

UNITED STATES PATENT OFFICE 1,933,562

FILM MAGAZINE

Frederick Michel, New York, N. Y., assignor to International Projector Corporation, New York, N. Y., a corporation of Delaware Application January 23, 1931. Serial No. 510,619

7 Claims. (Cl. 88—17)

This invention relates to film magazines and particularly to a removable film magazine adapted to be readily inserted into and removed from a motion picture camera such as are now used for taking motion pictures, especially the cameras used by amateurs.

An object of the invention is to provide a replaceable film magazine which may be manufactured on a mass production basis with such accuracy that each magazine will fit standard cameras and will function to take pictures successfully.

A further object of the invention is to provide simple and efficient means whereby, as the magazine is inserted into the camera a driving connection between one of the film supporting spools within the magazine and the driving mechanism of the camera will automatically be effected.

A further object of the invention is to provide a simple and efficient magazine in which a drive element on the outside of the magazine for automatic engagement with the driving mechanism of the camera will be properly and at all times protected from injury and contact while out of the camera.

A still further object is to provide a simple and efficient means whereby as the magazine is inserted in the camera, the camera feeding mechanism will be automatically allowed to engage the film in the magazine, only when the magazine has reached its full and complete insertable condition within the camera recess.

A still further object is to provide a simple and efficient construction in the form of a magazine casing of separable parts which when assembled form a compact enclosure for the film which is rigid and light-tight by reason of the snug engagement of certain interlocking parts.

Yet another object relates to provision of simple and efficient means whereby as the film is moved through the magazine a plurality of loops are formed therein at designated points, in order to relieve the feeding mechanism of undue burden in pulling the film through past the aperture opening.

Further and more specific objects, features and advantages will more clearly appear from a consideration of the specification hereinafter taken in connection with the accompanying drawings which form part of the specification and which illustrate a present preferred form of the invention.

Briefly and generally considered the invention comprises a separable casing formed by interlocking body and cover portions. This casing may be formed of any suitable material such as metal, fiber, wood, composition or pressed impregnated paper. Mounted on the body portion are take-up and supply spools for the film. The take-up spool is connected to a drive shaft which extends through the body wall and is connected on the outside to a driving gear. This driving gear is adapted and is so disposed on the face of the magazine that, as the magazine is inserted in the camera recess, in the usual manner, its driving gear will come into contact with and mesh with a driving gear on the camera mechanism disposed in or along the wall of the recess. Thus positive driving of the take-up spool in the magazine is automatically established merely by inserting the magazine in the camera. Disposed around the drive gear and outside face of the magazine throughout a major portion of its periphery, is a curved guard-plate, the top of which lies slightly above the level of the top of the gear to protect it from contact and blows and exposes only a sufficient portion of the gear teeth to permit automatic meshing, as above mentioned. A simple device in connection with this guard engages the gear to prevent its rotation backward.

A further feature of the invention resides in providing one wall of the magazine with a depression so disposed thereon that when the magazine is inserted in the opening of the camera for receiving the magazine, a guard-plate associated with the feeding mechanism will fall into the recess and permit the feeding mechanism to engage the film, which feeding mechanism under any other circumstances, is kept from engaging the film by the contact of the guard mechanism with the surface of the magazine.

A further feature of the invention resides in a sectional gate-plate disposed within the magazine back of a generously dimensioned aperture opening in one wall of the magazine, this gate-plate is formed in two sections one in the body portion and another in the cover portion. These sections are shouldered in such manner that when the cover is placed on the body portion, these shoulders will engage in planes parallel to the back of the aperture opening to fill the space back of the opening so as to prevent passage of light into the magazine.

A further feature resides in the provision of a simple inexpensive pressure shoe insertable in one face of the gate-plate to bear against the inner face of the film as it passes across the aperture opening and presses it forward so as to urge it into proper contact with the corresponding aperture portion of the camera.

A further feature of the invention is to provide pivoted rocker arms provided with film engagement elements engaging the film adjacent each end of the gate-plate. These arms are adapted to move under the action of pull on the film and being positively connected to each other by an intervening link so that the action on one rocker arm will cause the movement of the other rocker arm and vice-versa, to achieve the results hereinafter mentioned.

The invention further comprises a take-up spool adapted instantly to be connected to a shaft and provided with simple means for connecting the end of a film thereto.

A present preferred form of the invention is shown in the drawings of which:

Fig. 1 is a side elevation of the film carrying magazine;

Fig. 2 is a similar elevational view of the opposite side of the magazine;

Fig. 3 is a front elevation thereof;

Fig. 4 is an elevation of the side of the cover;

Fig. 5 is a front elevation of the body portion of the magazine;

Fig. 6 is a front elevation of the cover portion of the magazine;

Fig. 7 is an elevation of the inside of the body portion of the magazine;

Fig. 8 is a section taken on the line 8—8 of Fig. 3 showing the gate-plate and the inter-connected rocker arms;

Fig. 9 is a section taken on the line 9—9 of Fig. 2;

Fig. 10 is a section taken on the line 10—10 of Fig. 8; and

Fig. 11 is a similar section taken on the line 11—11 of Fig. 8.

In the preferred form of the invention shown in the drawings the magazine is of such type as to be shallow and rectangular in outline and small enough to be readily inserted in a pocket to be carried by the user, somewhat analogous to a film pack. It is adapted to be slipped into the camera magazine recess by opening the door thereof and pushing it into position. The act of assembling the magazine in the camera gives a proper presentation of the film into contact with the desired proper film receiving portion of the camera and at the same time effects the automatic engagement of the drive gear on the magazine with the driving mechanism of the camera.

In the form shown, the magazine preferably comprises a rectangular shaped shallow, body portion having a bottom wall 10 and lateral wall 11 with a corresponding cover having a top wall 12 and a lateral wall 13. Along one side of both the body portion and the cover, the lateral walls 11 and 13 are cut away as at 14 to form a rather elongated opening which is to be designated the aperture opening. Back of this opening in the body portion is disposed a gate-plate 15 having elevated portions 16 and 17 on the front thereof forming shoulders such as 18 facing rearwardly in a plane parallel to put back of the aperture in the wall 11. On the cover portion, as shown in Fig. 4, is a somewhat similar shaped section 19, which rests on the top of the gate-plate 15 when the cover is in position and lies back of the shoulders 18 to form a tie joint to prevent light from getting through this gate-plate.

In the front face of the gate-plate 15 the portions 17 and 16 having spaced portions forming a recess such as 20 in which is disposed preferably an integral single piece spring member 21 having a flat front face and off-set spring fingers such as 22 adapted to be housed in the inner portions of the recess formed in the front face of the gate-plate 15, this spring element 21 on its flat front face acts as a pressure shoe having a normal position and tendency to press forward a portion of the film passing in front of it as hereinafter to be described.

Referring to Figs. 4 and 7 it will be seen that the upper and lower ends of the gate-plate are slightly faced from and in back of the slots in the magazine to provide a channel through which the film can extend.

As shown in Fig. 7, the film 23 is wound on a spool mounted on shaft 24 within the magazine and extends over a roller or pin 25 disposed near the top of the gate-plate. This roller is mounted on one end of a rocker arm 26 pivoted loosely on shaft 24. The film extends downwardly through the channels between the gate-plate and the walls of the magazine, thence outwardly at a slight angle towards the face of the gate-plate to be presented in the rather elongated aperture opening, after which it passes into the lower elongated channel between the wall of the magazine and the lower end of the gate-plate and thence around another roller or pin 27 on the end of a second rocker arm 28 pivoted on a shaft 29, which shaft is hereinafter described as receiving a spool 30 called the take-up spool and to which take-up spool one end of the film is connected. The arms 26 and 28 opposite their pivot points are provided with lugs 31 and 32 having slots therein to receive the opposite ends of a connecting link 33 pivoted at 34 on the bottom of the magazine. As shown in Fig. 8, the spool 30 has a serrated bore 35 adapted to be slipped over the shaft 29 which has a squared portion 36 so that the spool will be received thereon in almost any position in which it is placed thereon. This spool has a peripheral groove 37, around which a flat spring 38 extends, beneath the front ends of which the end of the film 23 can be inserted to connect it to the take-up spool.

In Fig. 1, it will be noticed that the shaft 29 has a portion which extends through the wall of the magazine and at the outer end thereof a gear 39 is fastened. In Fig. 2 it will be observed that a guard plate 40 extends around a major portion of the gear 39, the thickness of this plate being greater than the thickness of the gear so that the face of the gear will be below the level of the guard plate, thus being protected from contact or danger of being struck. The guard-plate, however, will permit a sufficient portion of the gear to be exposed so that it will mesh with the proper drive gear in the camera recess as the magazine is inserted in said recess. A spring 41 on the guard-plate is adapted to engage the teeth of the gear 39 to act as a ratchet and prevent turning of the gear in one direction.

It will be observed that the body portion of the magazine is provided with a series of inwardly projecting ribs 42 which strengthen the magazine and at the same time provide a surface of minimum area with which the edge of the film will come in contact, thus reducing the wear, tear and friction as much as possible.

It will also be observed by a consideration of Fig. 9, that the cover portion is provided with posts 43 and 44 along those portions which align respectively with the stub shafts 24 and 29 and that the ends of these posts lie very closely adjacent the ends of the respective stub shafts when the cover is in position, so that further movement of the cover toward the body is positively prevented, whereby pinching of the film will be avoided. These posts, therefore, acting as positive spacing elements. Referring to Fig. 8, the gate-plate 15 shown therein is provided with a recess 45 and a through threaded bore 46 to the rear face thereof. In this bore a threaded shaft 47 is disposed having an enlarged head portion 48. This head portion is received in a center opening of a cup-shaped pressure shoe 49. Between the end face of this shoe and the bottom of the recess 45 a spring 50 is disposed to press the shoe outwardly against the film. The threaded shaft 47 permits the regulation of the extreme outward position of the shoe.

Referring to Figs. 1 and 3, it will be seen that one side wall of the magazine is provided with a depression 51. Adjacent this depression in Fig. 1 as shown, is a feeding claw 52 of the camera which is adapted to under certain conditions engage in the holes in the film to pull the same across the proper opening. Adjacent this claw is a guard-plate 53 of sufficiently larger area and extending beyond the front of the claw. Normally this guard-plate will first contact with the wall of the magazine as the magazine is being inserted and as shown in Fig. 1, will keep the claw away from the magazine. When the magazine has been fully inserted, however, the depression 51 is in line with the guard-plate 53. This plate will then fall into the depression permitting the claw to be advanced into engagement with the film whereby feeding of the film can be effected. This simple mechanism prevents any movement of the film until the magazine has been inserted to its proper position.

In summation, it will, therefore, be observed that this magazine can be carried around in the pocket ready to use and will when inserted in the camera recess be automatically engaged with the driving mechanism of the camera through the intermediary of the gear to the outside face thereof, which gear is fully prevented from undue movement by means of the guard-plate. This invention also provides simple means whereby the feeding claw is kept away from contact with the magazine on the film until that instant when the magazine reaches its full inserted position whereupon the claw flange or plate registers with its depression or recess and permits the engagement of the claw with the film. It will also be noticed that the rocker arms engaging the film at the ends are connected by the pivoted link. This action results in the movement of the upper rocker arm through the link whenever the pull of the film on the lower rollers tends to move the lower rocker arm and in this manner causes the upper rocker arm to pull on the supply of film and form a loop whereby the feeding mechanism can readily pull this free portion of film downward without having to pull the whole roll of film with its relatively heavy weight and inertia. The invention also permits the formation of a light-tight sectional guard by placing the cover on the body portion which cover is kept from being pinched too close to the body by reason of the spacing elements. The guard-plate is provided with a front recess to receive a simple, economically manufactured pressure shoe so mounted as to be readily adjustable to determine the normal pressure on the shoe and the film.

The invention is further characterized by a take-up spool readily removable from the magazine and it is easily put into place in positive connection with its driving shaft and having simple means in the form of a spring clip to permit the engagement therewith of the end of the film.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed is:

1. A removable film magazine for motion picture cameras which comprises a casing, a take-up spool within said casing, and a driving gear on the outside of the casing connected to said spool, and a curved guard-plate encircling a major portion of the periphery of said gear to protect it from injury, the thickness of said guard-plate being greater than the thickness of the gear, the only portion of the gear exposed being that portion which is adapted to mesh with the driving gear of the camera when the film magazine is inserted within the camera.

2. A removable film magazine for motion picture cameras which comprises a casing, a take-up spool within said casing, and a driving gear on the outside of the casing connected to said spool, and a guard member on the casing adjacent said gear, and a ratchet member on the guard-plate engaging the gear to prevent movement thereof in one direction.

3. A removable film magazine for motion picture cameras which comprises a shallow casing, a take-up spool therein, a shaft on which said spool is removably mounted, said shaft extending through the casing, a drive gear flat against the outside of the casing on said shaft, a guard on the casing encircling the major portion of said gear to protect it, said spool having a peripheral groove and a spring clip member lying in said groove and adapted to receive and hold the end of a film to be taken up on said spool.

4. A removable film magazine for motion picture cameras which comprises a shallow casing having one wall with an aperture opening therein, a depression in a lateral wall adjacent said front wall, a film engaging claw, said front wall also having an opening to receive said claw, a guard-plate adjacent and movable with said claw and having a greater area, one edge of said guard-plate extending beyond the point of the claw and adapted to ride on the front face of the magazine as it is being inserted in the camera, said plate adapted to drop into said recess or depression when the magazine is fully inserted into the camera, to permit the claw to enter the claw receiving aperture and engage the film for moving the same.

5. A removable film magazine for motion picture cameras which comprises a shallow casing having a body portion and a cover, having an aperture opening in one wall thereof, a sectional gate-plate disposed back of said opening and having a length greater than said opening, one of said sections carried by the body portion and another by the cover, said sections being provided with cooperating shoulders, the shoulders of said sections adapted to interlock when the sections are disposed together to form a light-tight joint, said shoulders meeting in a plane parallel to and spaced to the rear of said aperture opening in the front wall.

6. A removable film magazine for motion picture cameras which comprises a shallow casing having an elongated aperture opening in one wall thereof, a gate-plate of greater length disposed back of said opening, a film supply and take-up spools within said casing, said film adapted to pass between the gate and the aperture opening, rocker arms disposed adjacent each end of the gate and having elements therein to constantly engage the film, said rocker arms being pivoted and a link pivoted to the casing and attached at its opposite ends to said rocker arms whereby the movement of one arm will cause the movement of the other.

7. A replaceable film magazine for motion picture cameras which comprises a shallow casing having a front wall cut-away to form an elongated aperture opening, a gate-plate disposed within the casing back of said opening and having a front recess, a cup-shaped film pressure shoe in said recess and a spring in said recess back of said shoe and acting on said shoe to press it forward against the film.

FREDERICK MICHEL.